(12) United States Patent
Odem

(10) Patent No.: US 9,101,122 B2
(45) Date of Patent: Aug. 11, 2015

(54) CONCEALED HOOK FISH LURE

(71) Applicant: Jimmy D Odem, Saucier, MS (US)

(72) Inventor: Jimmy D Odem, Saucier, MS (US)

(*) Notice: Subject to any disclaimer, the term of this patent is extended or adjusted under 35 U.S.C. 154(b) by 194 days.

(21) Appl. No.: 13/803,574

(22) Filed: Mar. 14, 2013

(65) Prior Publication Data

US 2014/0259870 A1 Sep. 18, 2014

(51) Int. Cl.
*A01K 85/02* (2006.01)

(52) U.S. Cl.
CPC ...................... *A01K 85/02* (2013.01)

(58) Field of Classification Search
CPC ....................................................... A01K 85/02
USPC ................... 43/42.4–42.44, 34–36
See application file for complete search history.

(56) References Cited

U.S. PATENT DOCUMENTS

| 2,613,469 | A | * | 10/1952 | Haberkorn | 43/35 |
| 2,767,503 | A | * | 10/1956 | Fisher | 43/42.43 |
| 2,871,608 | A | * | 2/1959 | Fisher | 43/35 |
| 4,827,656 | A | * | 5/1989 | Ohnishi | 43/34 |
| 4,878,310 | A | * | 11/1989 | Hannon et al. | 43/42.04 |
| 4,922,645 | A | * | 5/1990 | Hannon et al. | 43/42.4 |
| 5,218,778 | A | * | 6/1993 | Szantor | 43/42.41 |
| 5,887,377 | A | | 3/1999 | Birko | |
| 7,356,963 | B2 | | 4/2008 | Scott | |
| 8,689,479 | B1 | * | 4/2014 | Smith | 43/37 |
| 2010/0146837 | A1 | | 6/2010 | Zernov | |
| 2012/0017488 | A1 | | 1/2012 | Partridge | |

* cited by examiner

*Primary Examiner* — Darren W Ark
*Assistant Examiner* — Marc Burgess
(74) *Attorney, Agent, or Firm* — Steve C. Thornton

(57) ABSTRACT

A concealed hook fish lure is disclosed. In one embodiment, a lure body contains an interior body cavity wherein is placed a hook that is pivotally mounted on a connecting rod. In a first position, the hook is concealed within the lure body and held in place by a first magnet up to the moment of the strike. At the moment of the strike, the fish presses a shaft portion of the concealed hook, which causes the hook to pivot on the connecting rod, thereby moving the hook to a second position where the hook extends outside the body cavity. The pivot movement of the hook from concealed position to deployed position is urged by a second magnet, which second magnet holds the hook in the deployed position, thereby facilitating the setting of the hook in the fish's mouth. The lure is useful in waters containing weeds and other debris, and provides improvements with respect to a simple mechanism for concealing and deploying the hook. The hook may also be readily retracted to and cocked in its concealed position following a strike.

1 Claim, 2 Drawing Sheets

CONCEALED HOOK FISH LURE

TECHNICAL FIELD OF THE INVENTION

This invention relates, in general, to mechanisms that utilize hooks to catch fish, such as fishing lures, and, in particular, to a lure having at least one hook concealed inside a body, thereby rendering the lure substantially weedless and non-snagging, which hook is held in the concealed position by means of a first magnet until the hook is depressed by the pressure of a fish striking the lure, whereupon the hook is moved into a catching position, where the hook is held by means of a second magnet.

BACKGROUND OF THE INVENTION

Artificial fishing lures used by anglers vary widely in their operation as well as their appearance. There have been many attempts in the past to provide a fish lure of the artificial bait or plug type having improved ability to catch fish when trolled or retrieved at the end of a line. The majority of such lures resemble or simulate prey, such as a small fish or insect which serves as a food source for carnivorous fish intended to be caught; and most such lures are provided with external pointed, barbed end hooks, in single, treble or gang configurations for engaging the fish when it strikes or swallows the lure, even partially. Such hooks embed in the throat or mouth of the fish when hit upon.

Exterior hooks present numerous problems. Some of the most common problems encountered with conventional fishing lures are weeds and obstructions snagging or collecting on exposed hooks, the visibility of the hooks, and failure of the hook to set firmly in the fish's mouth. There is the possibility that discerning fish avoid lures having hooks dangling therefrom. Exterior hooks can also interfere with the open-mouthed envelopment of the lure or at least the major portion thereof by the fish. When caught on under-water debris, exterior hooks may cause damage to the fishing rod or break the line. Exposed hooks also become entangled in fish line and with other equipment when the tackle container is being moved about.

In order to solve exterior hook problems, there have been numerous attempts to provide lures with hooks which are retracted within the body of the lure during normal trolling or retrieving action and then extended for engagement with the fish due to some action upon the lure by either the fish or by the fisherman upon sensing a fish strike. Many of these devices utilize spring mechanisms which keep the hook in a retracted position until the fish bites, whereupon the hook becomes exposed. Some of these devices require control or action by the fisherman to activate the hook's movement from its retracted position. The most common design of retracted hook lures incorporates the use of a moveable trigger to disengage one or more spring-biased hooks as the body of the lure makes contact with some restraining force and the trigger causes a disengagement of the spring-biased hooks.

Lures known in the art in which the hooks are concealed within the body of the lure and are designed to be exposed in response to a fish strike exhibit certain deficiencies relating to design function and complexity. One flaw that has yet to be remedied appears to be the inability to maintain the hooks in a retracted position during the initial cast. One example of the prior art devices of this kind is the type which require a multiplicity of events to occur for actuation—a fish strike and a pull on the fish line to effect ejection of the hook. For those fishing lures which have hooks hidden inside the lure body, and which are released by the angler pulling sharply on the fishing line, it is difficult for the fisherman to accurately time when the line must be pulled, or to know the difference between whether a fish has struck his bait or the lure has simply collided with a rock or other impediment. Others examples of prior art devices utilize complex linkage structures through which the hooks are triggered. Other known lures with concealed hooks allow such hooks a very limited exposure or range of travel when deployed into the exposed position. This limited exposure may permit some fish to spit or expel the lure after it has initially struck.

In general, problems encountered with the prior art devices include: (a) mechanisms difficult to assemble and keep operative; (b) unfavorable orientation of hooks or barbs for hooking and retrieving fish; (c) complex mechanisms for deploying the hook, and (d) mechanisms that involve moving parts subject to excessive corrosion and maintenance under practical conditions of use for fishing. As attempts to overcome these problems having been not altogether satisfactory, there is a need for a concealed-hook fishing lure that is useful in waters containing weeds and other debris, that is self setting, and having a simple mechanism for deploying the hook, and the ability to deploy hooks in multiple directions relative to the lure body.

SUMMARY OF THE INVENTION

A concealed-hook fish lure is disclosed which maintains by means of a first magnet the hook retracted within the lure body up to the moment of strike by a fish, and by utilizing the force of the fish's strike, extends the heretofore concealed hook upwardly into the mouth of the fish, which hook is held in its deployed position by means of a second magnet, thereby facilitating the setting of the hook in the fish's mouth, which lure is useful in waters containing weeds and other debris, and which provides improvements with respect to a simple mechanism for concealing and deploying the hook.

A further object is to provide such a lure in which the hook may be readily retracted to and cocked in its concealed position.

Another object is to provide a fish hook and lure assembly combining the features of a self-setting, weedless, concealed hook lure that is simple in operation, durable in use, and economical in manufacture.

Other objects, features and objectives of the invention will be found throughout the following description, the drawings and the claims.

BRIEF DESCRIPTION OF THE DRAWINGS

For a more complete understanding of the features and advantages of the present invention, reference is now made to the detailed description of the invention along with the accompanying figures in which corresponding numerals in different figures refer to corresponding parts and in which.

DETAILED DESCRIPTION OF THE INVENTION

Figure 1:
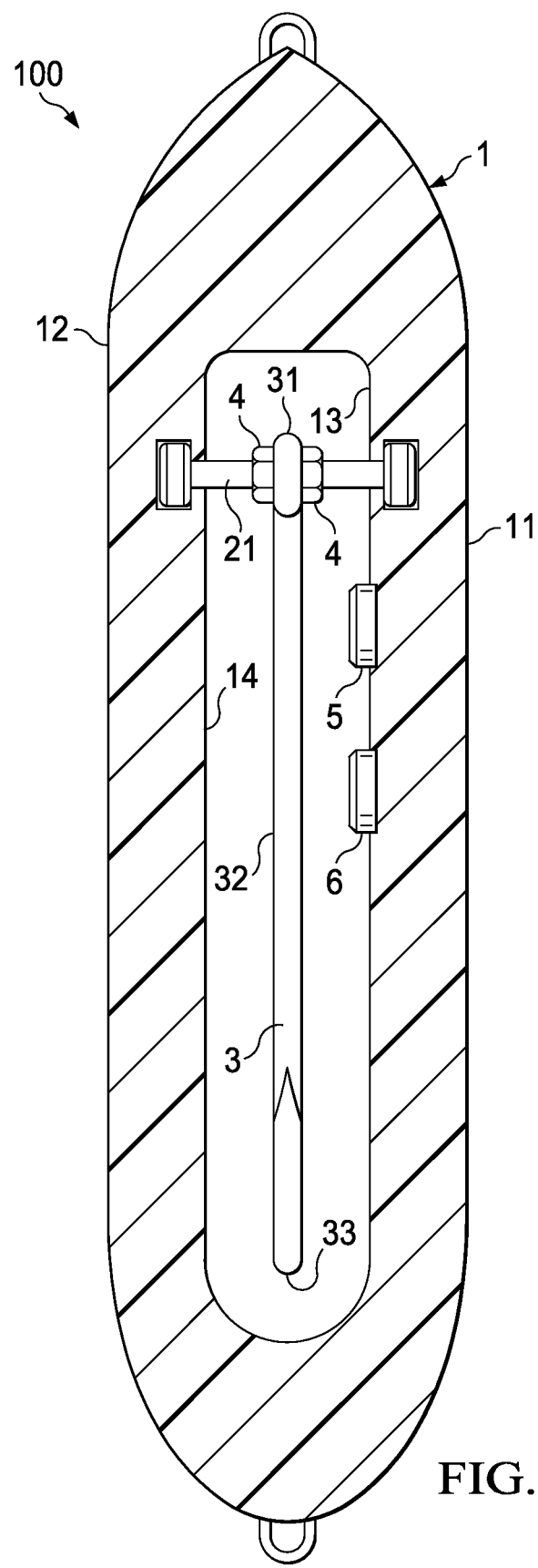
FIG. 1 is a top plan view of a fish lure according to the preferred embodiment of the present invention, showing the hook in the concealed, non-deployed position.

As seen in FIG. 1, the concealed-hook fish lure 100 of the present invention has a body 1 having exterior sides 11 and 12, and interior sides 13 and 14. Interior sides 13 and 14 of body 1 define a interior opening or cavity having a longitudinal axis along the body between the exterior sides of the body. The cavity provides a chamber in the body where one or more fishing hooks can be housed when the hooks are in a concealed position.

Figure 2:
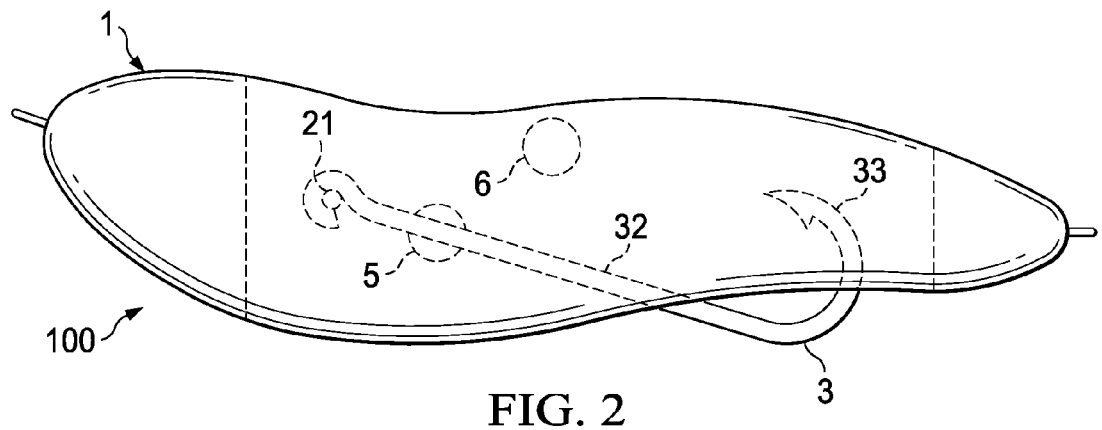
FIG. 2 is a side plan view of a fish lure according to the preferred embodiment of the present invention, showing the hook in the concealed, non-deployed position.
Figure 3:
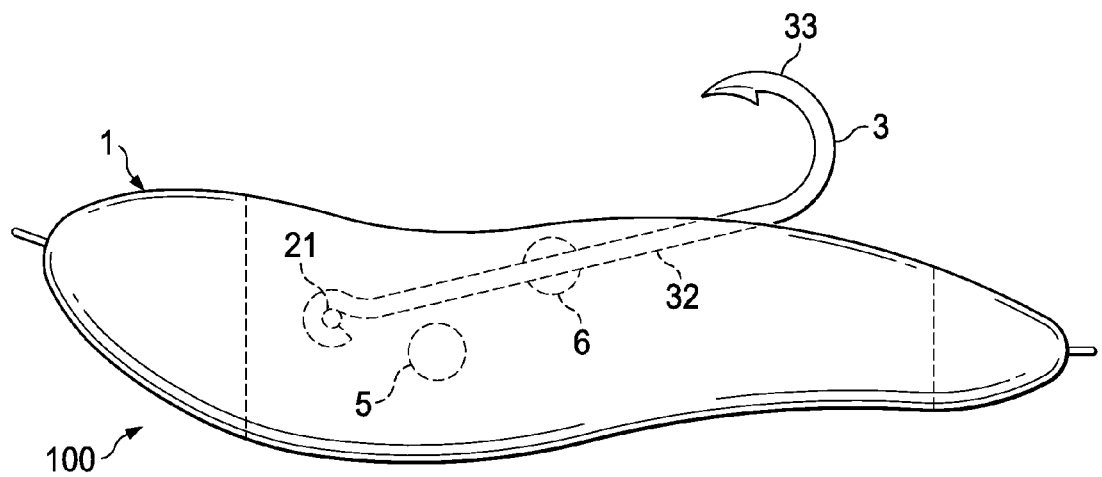
FIG. 3 is a side plan view of a fish lure according to the preferred embodiment of the present invention, showing the hook in the deployed position.

At least one connecting rod 21 is positioned between interior side 13 and interior side 14 of body 1. At least one hook 3, having a connecting portion 31, a shank portion 32, and a barbed end portion 33, is pivotally mounted to connecting rod 21 at the hook's connecting portion 31 by any usual mounting means, such as hook mounting bolt 4. As seen in FIG. 2, hook 3 may positioned relative to body 1 such that the hook 3 may be pivotally moved from a first or concealed position, where barbed end portion 33 of hook 3 is positioned inside the cavity of body 1, to a second or "deployed" position where barbed end portion 33 of hook 3 extends outside body 1. When hook 3 is in the concealed position, barbed end portion 33 of hook 3 is housed inside the cavity of body 1. As seen in FIG. 3, when hook 3 is in the deployed position, barbed end portion 33 of hook 3 extends outside body 1.

As seen in FIG. 1 and FIG. 2, at least one first magnet 5 may be positioned on interior side 13 such that first magnet 5 is aligned with shank portion 32 of hook 3 when hook 3 is in the concealed position. It will be understood that first magnet 5 may be of any appropriate size, that additional first magnets 5 may be positioned along interior side 13 in axial alignment with shank portion 32 of hook 3 when hook 3 is in the concealed position, and further that first magnet 5 may be positioned along interior side 14 as well as interior side 13, or positioned along both interior side 13 and interior side 14, in axial alignment with shank portion 32 of hook 3 when hook 3 is in the concealed position.

Also seen in FIG. 1 and FIG. 3, at least one second magnet 6 may be positioned on interior side 13 such that second magnet 6 is aligned with shank portion 32 of hook 3 when hook 3 is in the deployed position. It will be understood that second magnet 6 may be of any appropriate size, that additional second magnets 6 may be positioned along interior side 13 in axial alignment with shank portion 32 of hook 3 when hook 3 is in the deployed position; and further that additional second magnets 6 may be positioned along interior side 14 as well as interior side 13, or both interior side 13 and interior side 14, in axial alignment with shank portion 32 of hook 3 when hook 3 is in the deployed position.

When hook 3 is in the concealed position, as seen in FIG. 2, barbed end portion 33 of hook 3 is positioned inside the interior cavity of body 1 formed by interior sides 13 and 14, and shank portion 32 of hook 3 extends beyond body 1. Hook 3 is held in the concealed position by first magnet 5 until external pressure, such as the strike of a fish, presses hook 3 from the concealed position to the deployed position by external force on protruding shank portion 32 of hook 3. As external force on protruding shank portion 32 of hook 3 presses hook 3 away from the concealed position, magnetic force from second magnet 6 draws hook 3 from the concealed position toward the deployed position, where hook 3 is held by second magnet 6. FIG. 3 shows hook 3 in the deployed position.

While various embodiments of the invention have been described, the description is intended to be exemplary, rather than limiting and it will be apparent to those of ordinary skill in the art that other embodiments and implementations are possible that are within the scope of the invention. Accordingly, the invention is not to be restricted except in light of the attached claims and their equivalents.

The invention claimed is:

1. A concealed-hook fish lure comprising:
   a body having first and second exterior sides and first and second interior sides, with said first and second interior sides defining an open interior space in said body and defining a longitudinal axis between said first and second interior sides,
   at least one connecting rod positioned between said first and second interior sides of said body in said open interior space, and connected to said body,
   at least one hook having a connecting portion, a shank portion, and a barbed end portion, said at least one hook pivotally mounted on said at least one connecting rod at said connecting portion of said at least one hook, said at least one hook positioned parallel to said longitudinal axis and relative to said open interior space and said body such that said at least one hook may be pivotally moved within a vertical plane a first concealed position to a second deployed position,
   at least one first magnet mounted on said first or second interior side spaced laterally from said vertical plane in said open interior space of said body, said at least one first magnet positioned in said open interior space of said body proximate to said shank portion of said at least one hook and in alignment with said at least one hook when said at least one hook is in said first concealed position, and
   at least one second magnet mounted on said first or second interior side spaced laterally from said vertical plane in said open interior space of said body, said at least one second magnet positioned in said open interior space of said body proximate to said shank portion of said at least one hook and in alignment with said at least one hook when said at least one hook is in said second deployed position.

* * * * *